(12) United States Patent
Ma (10) Patent No.: US 10,019,341 B2
(45) Date of Patent: Jul. 10, 2018

(54) USING HARDWARE PERFORMANCE COUNTERS TO DETECT STALE MEMORY OBJECTS

(71) Applicant: Intel Corporation, Santa Clara, CA (US)

(72) Inventor: Zhiqiang Ma, Platteville, WI (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 14/495,932

(22) Filed: Sep. 25, 2014

(65) Prior Publication Data
US 2016/0092341 A1 Mar. 31, 2016

(51) Int. Cl.
*G06F 11/36* (2006.01)
(52) U.S. Cl.
CPC ................. *G06F 11/3636* (2013.01)
(58) Field of Classification Search
CPC ............. G06F 11/1482; G06F 11/2028; G06F 11/2035
See application file for complete search history.

(56) References Cited

U.S. PATENT DOCUMENTS

| | | | | |
|---|---|---|---|---|
| 2004/0216091 A1* | 10/2004 | Groeschel | ........... | G06F 11/3636 717/128 |
| 2004/0243981 A1* | 12/2004 | Luk | ....................... | G06F 8/4442 717/130 |
| 2005/0060521 A1* | 3/2005 | Wang | .................. | G06F 11/3636 712/227 |
| 2006/0248103 A1* | 11/2006 | Belcher | ................. | G06F 11/366 |
| 2014/0258677 A1* | 9/2014 | Sasanka | ..................... | G06F 8/41 712/7 |
| 2014/0310561 A1* | 10/2014 | Zhang | ................ | G06F 11/3636 714/38.1 |

OTHER PUBLICATIONS

Chilimbi, et al., "Low-Overhead Memory Leak Detection Using Adaptive Statistical Profiling", ASPLOS'04, ACM 1-58113-000-0/00/0004, Oct. 9-13, 2004, 9 pages.
Google Chrome, "Overview—How to access the DevTools", Jul. 22, 2014, 9 pages.
Sion Berkowits, "Pin—A Dynamic Binary Instrumentation Tool", Intel, Developer Zone, Jun. 13, 2012, 4 pages.

* cited by examiner

*Primary Examiner* — Jigar Patel
(74) *Attorney, Agent, or Firm* — Jordan IP Law, LLC (57) ABSTRACT

Systems and methods may provide for conducting an object trace of an allocation status of one or more objects in a computing system and using one or more hardware performance counters to conduct a hardware based address profiling of the computing system. Additionally, one or more stale objects in the system may be automatically identified based on the object trace and the hardware based address profiling. In one example, the object trace is initiated prior to a start of a task on the computing system and the hardware based address profiling is initiated in response to an end of the task on the computing system.

20 Claims, 4 Drawing Sheets

USING HARDWARE PERFORMANCE COUNTERS TO DETECT STALE MEMORY OBJECTS

TECHNICAL FIELD

Embodiments generally relate to the detection of stale objects. More particularly, embodiments relate to the use of hardware performance counters to detect stale memory objects.

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

During operation, computer programs may allocate memory to various objects in order to perform operations involved in executing the programs. When computer programs fail to de-allocate memory from objects that are no longer used, available memory reduces unnecessarily, which may have a negative impact on performance and may lead to system failures (e.g., when no additional memory is available).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
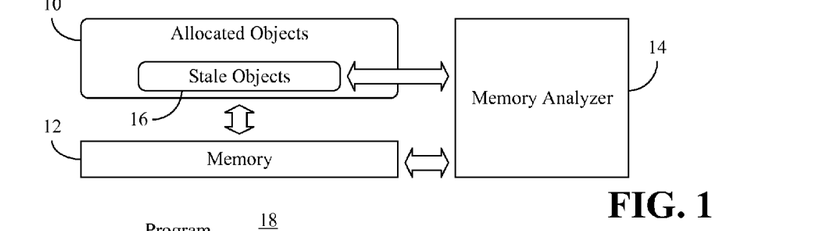
FIG. 1 a block diagram of an example of a memory analysis approach according to an embodiment.

Turning now to FIG. 1, a memory analysis approach is shown in which regions of a memory 12 (e.g., virtual heap memory) are allocated to a set of objects 10 during execution of a program on a computing system (not shown) such as, for example, a server (e.g., centralized or distributed), desktop computer, notebook computer, tablet computer, convertible tablet, smart phone, mobile Internet device (MID), personal digital assistant/PDA, media player, etc., or any combination thereof. In the illustrated example, a memory analyzer 14 identifies one or more stale objects 16 in the allocated objects 10. The code snippet below demonstrates one example of a stale memory object "p".

```
char *p;
int main( )
{
    ......            //do something
    p = malloc(1024); //allocate a memory object of 1024 bytes from heap
    ......            //do more things using p
    p[1023]= 0;       //last use of p (element 1023 of the p array)
                      //from this point on p will not be needed any longer,
                      //but p is not freed
    ......            //do something else without using p
}
```

Thus, a "memory stale" condition exists with respect to object p in the above example because p is no longer used and the memory space allocated to p cannot be reused by any other objects. A configurable threshold of the time period between the moment of last use and the moment of de-allocation may be used to automatically determine if p is stale. Identifying the stale objects 16 may enable the memory allocated to the stale objects 16 to be freed for subsequent use, which may in turn enhance the performance of the computing system. As will be discussed in greater detail, one approach to implementing the memory analyzer 14 may involve the use of object traces and hardware based address profiling that accesses hardware performance counters.

The illustrated approach may be used for native applications such as, for example, C or C++ applications, as well as for managed runtime applications having garbage collectors that automatically reclaim memory that is no longer being used. The managed runtime applications may include, but are not limited to, for example, HTML5 (Hypertext Markup Language 5, e.g., HTML5 Editor's Draft 8 May 2012, W3C), JAVASCRIPT, C# (e.g., C#5.0, MICROSOFT Corp., Aug. 15, 2012), Ruby (e.g., Ruby 2.1.0, Y. Matsumoto, Dec. 25, 2013), Perl (e.g., Perl 5.18.2, Perl.org, Jan. 7, 2014), Python (e.g., Python 3.3.3, Python Software Foundation, Nov. 19, 2013), JAVA (e.g., JAVA Standard Edition 7 Update 51, ORACLE Corp., Jan. 14, 2014), etc.

Figure 2:
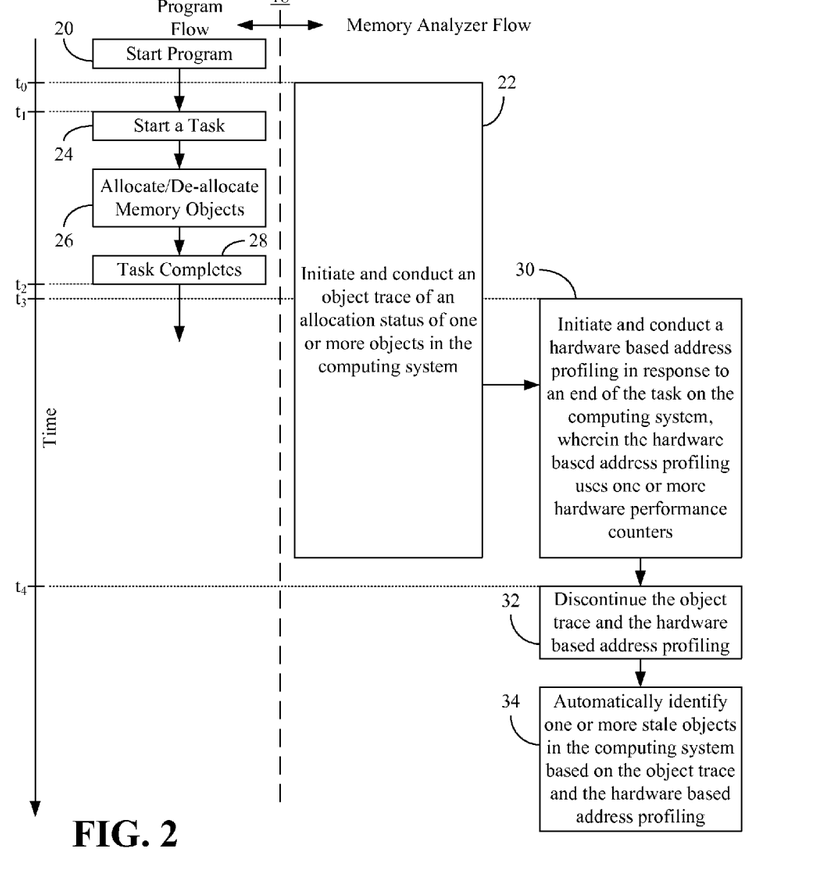
FIG. 2 is a flowchart of an example of a method of detecting stale objects according to an embodiment.

Turning now to FIG. 2, a method 18 of detecting stale objects is shown. The method 18 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 18 may be written in any combination of one or more programming languages, including an object oriented programming language such as C#, Ruby, Pearl, Python, JAVA or the like.

Illustrated program block 20 starts a program such as, for example, a messaging, browsing, word processing, imaging, media playing, or other type of program, wherein an analyzer block 22 may initiate and conduct an object trace of an allocation status of one or more objects in the computing system running the program. The object trace may track the allocation and de-allocation of memory (e.g., particular starting and ending addresses in memory) to objects defined and used in the computing system during operation of the program. The object trace may, for example, instrument every memory allocation and de-allocation function API (application programming interface) in the executable binary files associated with the program, add hook functions for object allocation and de-allocation into the source code of runtime and garbage collectors (e.g., of managed runtime environments), and so forth, in order to determine the allocation status of objects.

Additionally, the collected information may be maintained in an array or other suitable data structure during the object trace. Thus, for each object, the starting and ending address (e.g., address range) might be collected and stored in the array when the object is allocated. When an object is de-allocated, its address range may be removed from the array.

In the illustrated example, the object trace is initiated (at time $t_0$) prior to the start of a task at program block 24 (at time $t_1$). The task may include, for example, sending a message (e.g., started when a "New Mail" button is clicked), opening a web page (e.g., started when a link to the new page is selected), saving a document (e.g., started when a "Save As" button is clicked), and so forth. Thus, the illustrated object trace may track the specific memory objects allocated and de-allocated at program block 26 during execution of the task. The task may complete at program block 28 (at time $t_2$, e.g., when a "Send Mail" button is clicked, a requested web page is displayed, a "Save" button is clicked, and so forth), while the object trace continues. The program block 22 may therefore be considered a first phase of the stale object identification method 18.

Illustrated analyzer block 30 provides for initiating (at time $t_3$) and conducting a hardware based address profiling in response to the end of the task on the computing system. The hardware based address profiling may use one or more hardware performance counters to identify which memory addresses are being accessed on the computing system. Hardware performance counters may include registers and other fixed-functionality components/circuits that may be quickly accessed with minimal-to-no impact on processing overhead. The hardware based address profiling may therefore include sampling (e.g., at a fixed or variable sample rate or sample-after-value/SAV) memory load events as well as memory store events to determine the memory addresses being accessed at runtime. In one example, a precise event based sampling (PEBS) is used to conduct the hardware based address profiling. The collected information may also be maintained in an array or suitable data structure. The program block 30 may therefore be considered a second phase of the stale object identification method 18. Table I below shows one example of the results of a hardware based address profiling.

stale objects to be automatically identified in a manner that does not involve continually tracing each memory allocation, memory reference and memory de-allocation in the program at runtime. Rather, the illustrated approach leverages task beginning and completion information, which may generally be available to the program developer, in the stale object detection process.

More particularly, analyzer block 32 may discontinue (at time $t_4$) the object trace and the hardware based address profiling after the task completes at program block 28. The amount of time permitted to expire before conducting block 32 may be configured based on a variety of factors such as, for example, address sample rate, processor utilization/workload, the expected amount of time between the moment of last use and the moment of de-allocation, and so forth. Discontinuing the object trace and the hardware based address profiling as shown may result in a solution that has relatively low processing overhead. In one example, the object trace and the hardware based address profiling are discontinued in response to an end of the program that executed the task (e.g., close of a messaging program).

One or more stale objects may be automatically identified in the computing system at block 34 based on the object trace and the hardware based address profiling. Identifying the stale objects may include, for example, determining whether one or more addresses associated with the hardware based address profiling are within one or more address ranges associated with the object trace. In such a case, the stale objects may be those objects that are identified by the object trace as being allocated (e.g., and not de-allocated) and identified by the hardware based address profiling as not being accessed. The pseudo code below illustrates one approach to automatically identifying the stale objects.

```
for (each memory object m in the memory object array) do {
    for (each sample s in the data address sample array) do {
        if ((s.data_linear_address >= m.starting_address) &&
            (s.data_linear_address < m.ending_address)) do {
            remove m from the memory object array;
            break;
        }
    }
}
if (memory object array is empty) do {
    report no memory stales detected;
}
else {
    for (each memory object m in the memory object array) do {
        report m as stale;
}
```

TABLE I

| Sample ID | Process Name | Event Name | Time Stamp | Data Linear Addr |
|---|---|---|---|---|
| 4 | read22 | LoadEvent | 0x002846E54B4E7557 | 0x00007FFF497B453C |
| 5 | read22 | LoadEvent | 0x002846E54B4EFACB | 0x00007FFF497B453C |
| 6 | read22 | LoadEvent | 0x002846E54B4F7CEB | 0x00007FFF497B4534 |
| 7 | read22 | LoadEvent | 0x002846E54B5001A7 | 0x00007FFF497B453C |
| 8 | read22 | LoadEvent | 0x002846E54B50864F | 0x00007FFF497B453C |
| 9 | read22 | LoadEvent | 0x002846E54B510B6F | 0x00007FFF497B453C |

Thus, sample #4 in Table I indicates that process "read22" reads the memory at address 0x00007FFF497B453C. As will be discussed in greater detail below, comparing the addresses associated with the hardware based profiling to the address ranges associated with the object trace may enable Where s.data_linear_address is an address detected during the hardware based address profiling, m.starting_address is the starting address of memory allocated to the object in question and m.ending_address is the ending address of the memory allocated to the object in question. Analyzer blocks 32 and 34 may therefore represent a third phase of the illustrated stale object identification method 18, wherein the third phase leverages task information to substantially reduce processing overhead.

Figure 3:
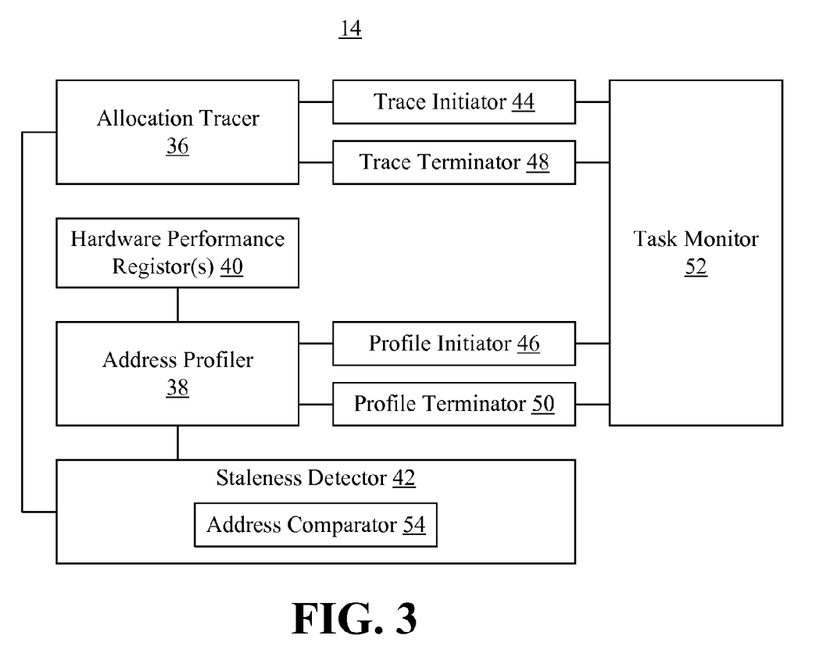
FIG. 3 is a block diagram of an example of a memory analyzer according to an embodiment.

FIG. 3 shows one approach to implementing the memory analyzer 14. The memory analyzer 14 may generally conduct one or more aspects of the method 18 (FIG. 2), already discussed. The memory analyzer 14 may include an allocation tracer 36 that conducts an object trace of an allocation status of one or more objects in a computing system, wherein an address profiler 38 may use one or more well known hardware performance registers 40 to conduct a hardware based address profiling of the computing system. The illustrated memory analyzer 14 also includes a staleness detector 42 coupled to the allocation tracer 36 and the address profiler 38, wherein the staleness detector 42 automatically identifies one or more stale objects in the computing system based on the object trace and the hardware based address profiling. At least one of the one or more stale objects may be identified by the object trace as being allocated and identified by the hardware based address profiling as not being accessed.

In one example, a trace initiator 44 initiates the object trace prior to a start of a task on the computing system. Additionally, a profile initiator 46 may initiate the hardware based address profiling in response to an end of the task on the computing system. The illustrated memory analyzer 14 also includes a trace terminator 48 to discontinue the object trace after the end of the task on the computing system and a profile terminator 50 to discontinue the hardware based address profiling after the end of the task on the computing system. In this regard, task beginning and completion information (e.g., events, interrupts, etc.), may be obtained from a task monitor 52. As already noted, the object trace and the hardware based address profiling may be discontinued in response to the end of a program that executed the task.

The staleness detector 42 may also include an address comparator 54 to determine whether one or more address associated with the hardware based address profiling are within one or more address ranges associated with the object trace. Moreover, the address profiler 38 may sample memory load events and memory store events during the hardware based address profiling.

Figure 4:
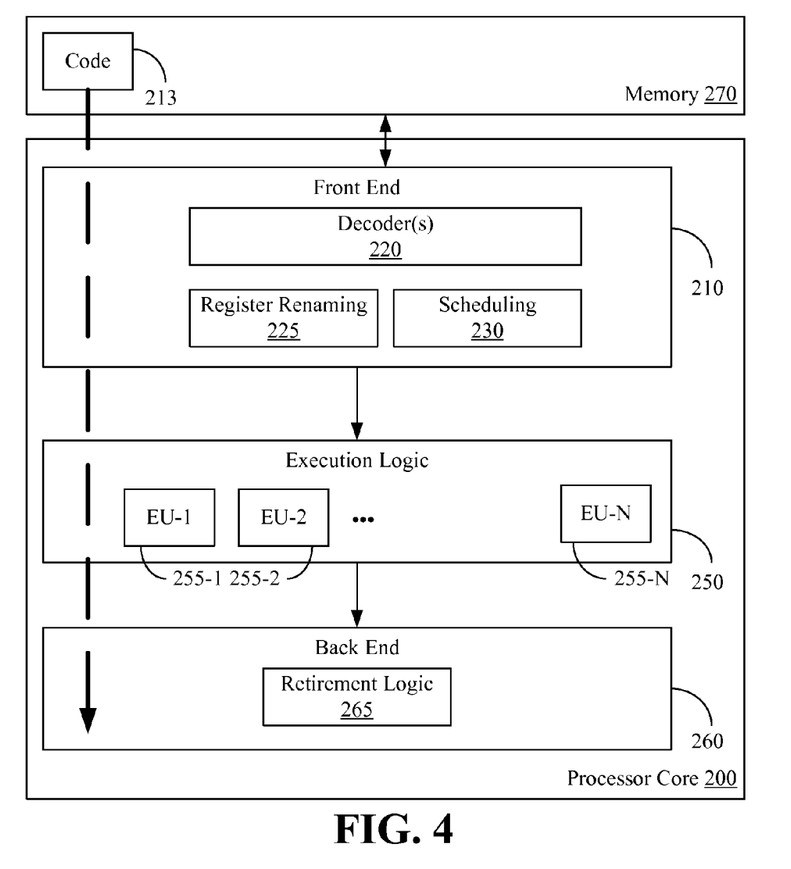
FIG. 4 is a block diagram of an example of a processor according to an embodiment.

FIG. 4 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 18 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
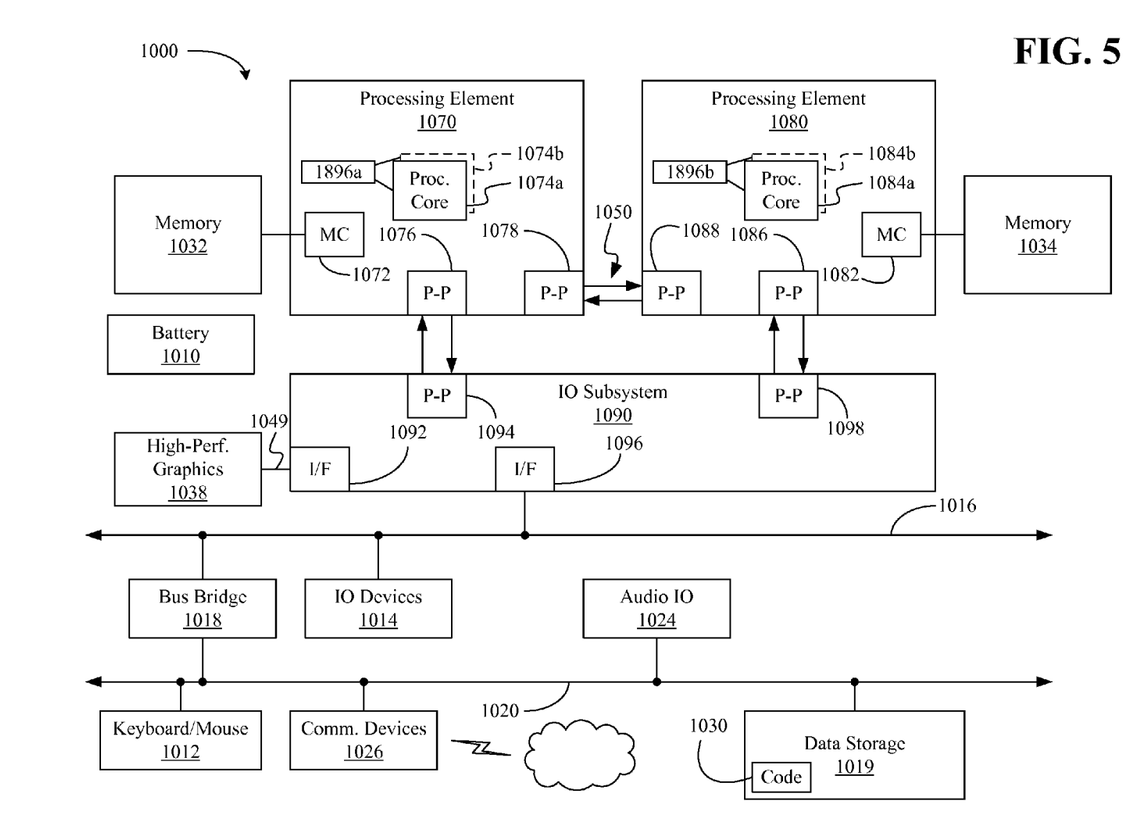
FIG. 5 is a block diagram of an example of a system according to an embodiment.

Referring now to FIG. 5, shown is a block diagram of a system 1000 embodiment in accordance with an embodiment. Shown in FIG. 5 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 4.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 and 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 18 (FIG. 2), already discussed, and may be similar to the code 213 (FIG. 4), already discussed. Further, an audio I/O 1024 may be coupled to second bus 1020.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

ADDITIONAL NOTES AND EXAMPLES

Example 1 may include a memory analyzer comprising a trace initiator to initiate an object trace of an allocation status of one or more objects in a computing system prior to a start of a task on the computing system, an allocation tracer to conduct the object trace, a profile initiator to initiate a hardware based address profiling in response to an end of the task on the computing system, an address profiler to use one or more hardware performance counters to conduct the hardware based address profiling, and a staleness detector to automatically identify one or more stale objects in the computing system based on the object trace and the hardware based address profiling, wherein the staleness detector includes an address comparator to determine whether one or more addresses associated with the hardware based address profiling are within one or more address ranges associated with the object trace, and wherein at least one of the one or more stale objects are to be identified by the object trace as being allocated and identified by the hardware based address profiling as not being accessed.

Example 2 may include the memory analyzer of Example 1, further including a trace terminator to discontinue the object trace after the end of the task on the computing system, and a profile terminator to discontinue the hardware based address profiling after the end of the task on the computing system.

Example 3 may include the memory analyzer of Example 2, wherein the object trace and the hardware based address profiling are to be discontinued in response to an end of a program that executed the task.

Example 4 may include the memory analyzer of any one of Examples 1 to 3, wherein the address profiler is to sample memory load events and memory store events during the hardware based address profiling.

Example 5 may include a method of analyzing memory, comprising conducting an object trace of an allocation status of one or more objects in a computing system, using one or more hardware performance counters to conduct a hardware based address profiling of the computing system, and automatically identifying one or more stale objects in the computing system based on the object trace and the hardware based address profiling.

Example 6 may include the method of Example 5, further including initiating the object trace prior to a start of a task on the computing system, and initiating the hardware based address profiling in response to an end of the task on the computing system.

Example 7 may include the method of Example 6, further including discontinuing the object trace and the hardware based address profiling after the end of the task on the computing system.

Example 8 may include the method of Example 7, wherein the object trace and the hardware based address profiling are discontinued in response to an end of a program that executed the task.

Example 9 may include the method of Example 5, wherein at least one of the one or more stale objects are identified by the object trace as being allocated and identified by the hardware based address profiling as not being accessed.

Example 10 may include the method of Example 5, wherein automatically identifying the one or more stale objects includes determining whether one or more addresses associated with the hardware based address profiling are within one or more address ranges associated with the object trace.

Example 11 may include the method of any one of Examples 5 to 10, wherein the hardware based address profiling includes sampling memory load events and memory store events.

Example 12 may include at least one computer readable storage medium comprising a set of instructions which, when executed by a computing system, cause the computing system to conduct an object trace of an allocation status of one or more objects in the computing system, use one or more hardware performance counters to conduct a hardware based address profiling of the computing system, and automatically identify one or more stale objects in the computing system based on the object trace and the hardware based address profiling.

Example 13 may include the at least one computer readable storage medium of Example 12, wherein the instructions, when executed, cause the computing system to initiate the object trace prior to a start of a task on the computing system, and initiate the hardware based address profiling in response to an end of the task on the computing system.

Example 14 may include the at least one computer readable storage medium of Example 13, wherein the instructions, when executed, cause the computing system to discontinue the object trace and the hardware based address profiling after the end of the task on the computing system.

Example 15 may include the at least one computer readable storage medium of Example 14, wherein the object trace and the hardware based address profiling are to be discontinued in response to an end of a program that executed the task.

Example 16 may include the at least one computer readable storage medium of Example 12, wherein at least one of the one or more stale objects are to be identified by the object trace as being allocated and identified by the hardware based address profiling as not being accessed.

Example 17 may include the at least one computer readable storage medium of Example 12, wherein the instructions, when executed, cause the computing system to determine whether one or more addresses associated with the hardware based address profiling are within one or more address ranges associated with the object trace.

Example 18 may include the at least one computer readable storage medium of any one of Examples 12 to 17, wherein the instructions, when executed, cause the computing system to sample memory load events and memory store events during the hardware based address profiling.

Example 19 may include a memory analyzer comprising an allocation tracer to conduct an object trace of an allocation status of one or more objects in a computing system, an address profiler to use one or more hardware performance counters to conduct a hardware based address profiling of the computing system, and a staleness detector to automatically identify one or more stale objects in the computing system based on the object trace and the hardware based address profiling.

Example 20 may include the memory analyzer of Example 19, further including a trace initiator to initiate the object trace prior to a start of a task on the computing system, and a profile initiator to initiate the hardware based address profiling in response to an end of the task on the computing system.

Example 21 may include the memory analyzer of Example 20, further including a trace terminator to discontinue the object trace after the end of the task on the computing system, and a profile terminator to discontinue the hardware based address profiling after the end of the task on the computing system.

Example 22 may include the memory analyzer of Example 21, wherein the object trace and the hardware based address profiling are to be discontinued in response to an end of a program that executed the task.

Example 23 may include the memory analyzer of Example 19, wherein at least one of the one or more stale objects are to be identified by the object trace as being allocated and identified by the hardware based address profiling as not being accessed.

Example 24 may include the memory analyzer of Example 19, wherein the staleness detector includes an address comparator to determine whether one or more addresses associated with the hardware based address profiling are within one or more address ranges associated with the object trace.

Example 25 may include the memory analyzer of any one of Examples 19 to 24, wherein the address profiler is to sample memory load events and memory store events during the hardware based address profiling.

Example 26 may include a memory analyzer comprising means for conducting an object trace of an allocation status of one or more objects in a computing system, means for using one or more hardware performance counters to conduct a hardware based address profiling of the computing system, and means for automatically identifying one or more stale objects in the computing system based on the object trace and the hardware based address profiling.

Example 27 may include the memory analyzer of Example 26, further including means for initiating the object trace prior to a start of a task on the computing system, and means for initiating the hardware based address profiling in response to an end of the task on the computing system.

Example 28 may include the memory analyzer of Example 27, further including means for discontinuing the object trace and the hardware based address profiling after the end of the task on the computing system.

Example 29 may include the memory analyzer of Example 28, wherein the object trace and the hardware based address profiling are discontinued in response to an end of a program that executed the task.

Example 30 may include the memory analyzer of Example 26, wherein at least one of the one or more stale objects are to be identified by the object trace as being allocated and identified by the hardware based address profiling as not being accessed.

Example 31 may include the memory analyzer of Example 26, wherein the means for automatically identifying the one or more stale objects includes means for determining whether one or more addresses associated with the hardware based address profiling are within one or more address ranges associated with the object trace.

Example 32 may include the memory analyzer of any one of Examples 26 to 31, wherein the hardware based address profiling includes sampling memory load events and memory store events.

Thus, techniques may be used in native (e.g., C/C++) and/or managed runtime (e.g., JAVA/HTML5/JAVASCRIPT) environments to develop low-overhead memory tools.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An apparatus comprising:
a trace initiator to initiate an object trace of an allocation status of one or more objects in a computing system prior to a start of a task on the computing system;
an allocation tracer to conduct the object trace, the object trace to track allocation and deallocation of memory during execution of the task;
a profile initiator to initiate a hardware based address profiling in response to and only after an end of the task on the computing system, the hardware based address profiling to identify one or more addresses being accessed after the end of the task;
an address profiler to use one or more hardware performance counters to conduct the hardware based address profiling; and
a staleness detector to automatically identify one or more stale objects in the computing system based on the object trace and the hardware based address profiling, wherein the staleness detector includes an address comparator to determine whether the one or more addresses associated with the hardware based address profiling are within one or more address ranges associated with the object trace, wherein at least one of the one or more stale objects are to be identified by the object trace as being allocated and not deallocated, and further identified by the hardware based address profiling as not being accessed after the end of the task, and further wherein a first of the one or more address ranges is to be disassociated from the object trace when a first of the one or more addresses associated with the hardware based address profiling is within the first address range.

2. The apparatus of claim 1, further including:
a trace terminator to discontinue the object trace after the end of the task on the computing system; and
a profile terminator to discontinue the hardware based address profiling after the end of the task on the computing system.

3. The apparatus of claim 2, wherein the object trace and the hardware based address profiling are to be discontinued in response to an end of a program that executed the task.

4. The apparatus of claim 1, wherein the address profiler is to sample memory load events and memory store events during the hardware based address profiling.

5. The apparatus of claim 1, wherein the one or more address ranges associated with the object trace are to be stored in a data structure, and the first address range is to be removed from the data structure when the first address range is disassociated from the object trace.

6. A method comprising:
initiating an object trace of an allocation status of one or more objects in a computing system prior to a start of a task in the computing system;
conducting the object trace, the object trace to track allocation and deallocation of memory during execution of the task;
initiating a hardware based address profiling of the computing system in response to and only after an end of the task in the computing system, the hardware based address profiling to identify one or more addresses being accessed on the computing system after the end of the task;
using one or more hardware performance counters to conduct the hardware based address profiling; and automatically identifying one or more stale objects in the computing system based on the object trace and the hardware based address profiling;

wherein at least one of the one or more stale objects are identified by the object trace as being allocated and not deallocated, and further identified by the hardware based address profiling as not being accessed after the end of the task.

7. The method of claim 6, further including discontinuing the object trace and the hardware based address profiling after the end of the task on the computing system.

8. The method of claim 7, wherein the object trace and the hardware based address profiling are discontinued in response to an end of a program that executed the task.

9. The method of claim 6, wherein automatically identifying the one or more stale objects includes determining whether the one or more addresses identified by the hardware based address profiling are within one or more address ranges associated with the object trace.

10. The method of claim 6, wherein the hardware based address profiling includes sampling memory load events and memory store events.

11. At least one non-transitory computer readable storage medium comprising a set of instructions which, when executed by a computing system, cause the computing system to:

initiate an object trace of an allocation status of one or more objects in the computing system prior to a start of a task in the computing system;

conduct the object trace, the object trace to track allocation and deallocation of memory during execution of the task;

initiate a hardware based address profiling of the computing system in response to and only after an end of the task on the computing system, the hardware based address profiling to identify one or more addresses being accessed on the computing system after the end of the task;

use one or more hardware performance counters to conduct the hardware based address profiling; and automatically identify one or more stale objects in the computing system based on the object trace and the hardware based address profiling;

wherein at least one of the one or more stale objects are to be identified by the object trace as being allocated and not deallocated, and further identified by the hardware based address profiling as not being accessed after the end of the task.

12. The at least one non-transitory computer readable storage medium of claim 11, wherein the instructions, when executed, cause the computing system to discontinue the object trace and the hardware based address profiling after the end of the task on the computing system.

13. The at least one non-transitory computer readable storage medium of claim 12, wherein the object trace and the hardware based address profiling are to be discontinued in response to an end of a program that executed the task.

14. The at least one non-transitory computer readable storage medium of claim 11, wherein the instructions, when executed, cause the computing system to determine whether the one or more addresses identified by the hardware based address profiling are within one or more address ranges associated with the object trace.

15. The at least one non-transitory computer readable storage medium of claim 11, wherein the instructions, when executed, cause the computing system to sample memory load events and memory store events during the hardware based address profiling.

16. An apparatus comprising:

a trace initiator to initiate an object trace of an allocation status of one or more objects in a computing system prior to a start of a task on the computing system;

an allocation tracer to conduct the object trace, the object trace to track allocation and deallocation of memory during execution of the task;

a profile initiator to initiate a hardware based address profiling of the computing system in response to and only after an end of the task on the computing system, the hardware based address profiling to identify one or more addresses being accessed on the computing system after the end of the task;

an address profiler to use one or more hardware performance counters to conduct the hardware based address profiling; and a staleness detector to automatically identify one or more stale objects in the computing system based on the object trace and the hardware based address profiling;

wherein at least one of the one or more stale objects are to be identified by the object trace as being allocated and not deallocated, and further identified by the hardware based address profiling as not being accessed after the end of the task.

17. The apparatus of claim 16, further including:

a trace terminator to discontinue the object trace after the end of the task on the computing system; and a profile terminator to discontinue the hardware based address profiling after the end of the task on the computing system.

18. The apparatus of claim 17, wherein the object trace and the hardware based address profiling are to be discontinued in response to an end of a program that executed the task.

19. The apparatus of claim 16, wherein the staleness detector includes an address comparator to determine whether the one or more addresses identified by the hardware based address profiling are within one or more address ranges associated with the object trace.

20. The apparatus of claim 16, wherein the address profiler is to sample memory load events and memory store events during the hardware based address profiling.

* * * * *